United States Patent

Fukui et al.

Patent Number: 4,764,583
Date of Patent: Aug. 16, 1988

[54] MELT-MOLDABLE WHOLLY AROMATIC POLYESTER

[75] Inventors: Kunisuke Fukui, Hiroshima; Masanori Motooka, Iwakuni, both of Japan

[73] Assignee: Mitsui Petrochemical Industries, Ltd., Tokyo, Japan

[21] Appl. No.: 24,087

[22] Filed: Mar. 10, 1987

[30] Foreign Application Priority Data

Mar. 14, 1986 [JP] Japan ................................. 61-54680
Nov. 4, 1986 [JP] Japan ................................. 61-260767

[51] Int. Cl.$^4$ ........................ C08G 63/60; C08G 63/66
[52] U.S. Cl. ................................... 528/193; 528/176; 528/194
[58] Field of Search ..................... 528/176, 193, 194

[56] References Cited

U.S. PATENT DOCUMENTS 4,238,598 12/1980 Favstritsky .......................... 528/193
4,599,397 7/1986 Yoshimura et al. ................ 528/190

Primary Examiner—Lucille M. Phynes
Attorney, Agent, or Firm—Sherman and Shalloway

[57] ABSTRACT

A melt-moldable wholly aromatic polyester comprising (A) aromatic hydroxycarboxylic acid residues, (B) aromatic diol residues, (C) 4,4'-dihydroxydiphenyl ether residues represented by the following formula

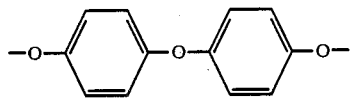

and (D) aromatic dicarboxylic acid residues, and a melt-moldable wholly aromatic polyester comprising (A) aromatic hydroxycarboxylic acid residues, (C)' aromatic diol residues represented by the following formula

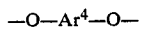

—O—Ar$^4$—O— wherein Ar$^4$ represents a group at least 60 mole % of which consists of a group of the following formula (a)

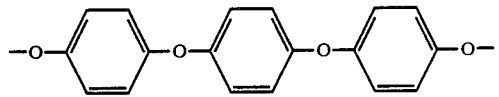

or a group of the formula (a) and a group of the following formula (b)

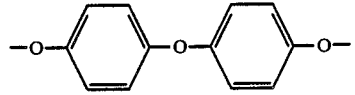

and (D) aromatic dicarboxylic acid residues.

22 Claims, No Drawings

MELT-MOLDABLE WHOLLY AROMATIC POLYESTER

This invention relates to a melt-moldable wholly aromatic polyester, and more specifically, to a wholly aromatic copolyester which is excellent in mechanical properties such as flexural rigidity, tensile strength and impact strength, heat resistance, and in hydrolysis resistance at high temperatures.

Polyesters derived from p-hydroxybenzoic acid have been known as aromatic polyesters having excellent heat resistance. Since, however, the p-hydroxybenzoic acid-derived polyesters are difficult to obtain in high molecular weight and undergo marked thermal decomposition during melting, they cannot be molded by ordinary melt-molding methods such as injection molding or extrusion and in spite of their high heat resistance, have hardly been utilized industrially.

Attempts have been made to remedy these defects of the p-hydroxybenzoic acid-derived polyesters by co-condensing p-hydroxybenzoic acid with various other aromatic dicarboxylic acids and various aromatic diols.

U.S. Pat. No. 3,637,595 describes a process for producing a heat-resistant polyester, which comprises condensing an oxybenzoyl compound represented by the following formula A

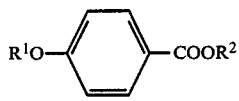

wherein $R^1$ represents a hydrogen atom or a benzoyl or lower alkanoyl group, and $R^2$ represents a hydrogen atom, or a phenyl, benzyl or lower alkyl group, an aromatic dicarbonyl compound represented by the following formula B

wherein $R^3$ and $R^4$, independently from each other, represent a hydrogen atom, or a phenyl, benzyl or lower alkyl group, provided that the carbonyl groups in the formula are meta or para to each other, and an aromatic dioxy compound represented by the following formula C

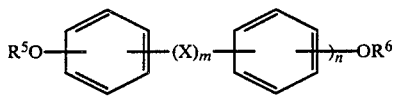

wherein $R^5$ and $R^6$, independently from each other, represent a hydrogen atom, or a benzoyl or lower alkanoyl group, X represents —O— or $SO_2$—, m is 0 or 1, and n is 0 or 1 provided that the oxy groups in the formula are meta or para to each other, the mole ratio of the oxybenzoyl compound A to the aromatic dicarbonyl compound B being from 1:100 to 100:1, and the mole ratio of the aromatic dicarboxyl compound B to the aromatic dioxy compound B being from 15:10 to 10:15.

U.S. Pat. No. 4,603,190 and the corresponding Japanese Laid-Open Patent Publication No. 38425/1985 discloses a thermotropic wholly aromatic polyester based on (a) optionally substituted p-hydroxybenzoic acid, (b) isophthalic acid and optionally terephthalic acid, (c) hydroquinone and (d) 3,4'- and/or 4,4'-dihydroxy-diphenyl, 3,4'- and/or 4,4'-dihydroxy-diphenylether and/or 3,4'- and/or 4,4'-dihydroxy-diphenylsulfite, wherein the mole ratio of the condensed residues a/b is from 80:20 to 50:50, the mole ratio of the condensed residues b/c/d is from 20:10:10 to 50:48:2, the mole ratio of the condensed residues b/(c+d) is from 0.95 to 1.05, and up to 50 mole % of the component (b) may be composed of terephthalic acid. These patent documents also state that an anisotropic molten phase was not observed in the reaction product produced from 2.4 moles of p-hydroxybenzoic acid, 1.44 moles of terephthalic acid, 1.2 moles of hydroquinone and 0.24 mole of 4,4'-dihydroxydiphenylether as raw materials.

The p-hydroxybenzoic acid-derived copolyesters proposed in the foregoing prior art references have improved melt-moldability since they melt at lower temperatures than does the p-hydroxybenozic acid homopolyester. However, with this improvement, there is a reduction in heat resistance. Furthermore, many of such p-hydroxybenzoic acid copolyesters undergo a reduction in mechanical properties such as flexural rigidity, tensile strength and impact strength, chemical resistance and water resistance.

It is an object of this invention to provide a melt-moldable wholly aromatic polyester having a novel composition.

Another object of this invention is to provide a wholly aromatic polyester which is excellent in mechanical properties such as flexural rigidity, tensile strength and impact strength as well as heat resistance and hydrolysis resistance.

Still another object of this invention is to provide a wholly aromatic polyester which because of its excellent melt moldability, can be molded into various articles by ordinary injection molding or extrusion, and particularly into fibers by the same method as the melt-spinning method for polyethylene terephthalate.

Further objects and advantages of this invention will become apparent from the following description.

According to this invention, these objects and advantages are firstly achieved by a melt-moldable wholly aromatic polyester comprising (A) aromatic hydroxycarboxylic acid residues represented by the following formula (I)

$$-CO-Ar^1-O- \quad (I)$$

wherein $Ar^1$ represents a divalent aromatic hydrocarbon group at least 60 mole % of which consists of a p-phenylene group, (B) aromatic diol residues represented by the following formula (II)

$$-O-Ar^2-O- \quad (II)$$

wherein $Ar^2$ represents at least one divalent aromatic group selected from p-phenylene and 4,4'-diphenylene groups, (C) 4,4'-dihydroxydiphenyl ether residues represented by the following formula (III)

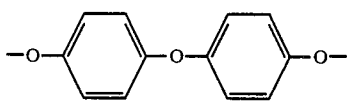 (III)

and (D) aromatic dicarboxylic acid residues represented by the following formula (IV)

 (IV)

wherein $Ar^3$ represents a divalent aromatic group at least 60 mole % of which consists of a p-phenylene group, and (E) the proportions of the residues (A), (B), (C) and (D) being 30–80 mole %, 1–20 mole %, 1–32 mole % and 10–35 mole %, respectively, based on the total moles of the residues (A), (B), (C) and (D), provided that the sum of the moles of the residues (B) and (C) is substantially equal to the moles of the residues (D).

The wholly aromatic polyester of the invention can be produced by heating an ester-forming derivative of an aromatic hydroxycarboxylic acid, an ester-forming derivative of an aromatic diol, an ester-forming derivative of 4,4'-dihydroxydiphenyl ether and an aromatic dicarboxylic acid or its ester-forming derivative at an elevated temperature under reduced pressure, and distilling off the resulting low-boiling compounds.

The ester-forming derivative of an aromatic hydroxycarboxylic acid which gives the aromatic hydroxycarboxylic acid residues (A) represented by formula (I) is derived from an aromatic hydroxycarboxylic acid represented by the following formula (I)'

 (I)' wherein $Ar^{11}$ represents a divalent aromatic hydrocarbon group such as a p-phenylene group.

Examples of the aromatic hydroxycarboxylic acid represented by formula (I)' are p-hydroxybenzoic acid, m-hydroxybenzoic acid and 6-hydroxy-2-naphthoic acid. Examples of the ester-forming derivatives are esters at the hydroxy group of these aromatic hydroxycarboxylic acids, for example $C_2$–$C_6$ alkanoyl esters, benzoyl esters, and esters at the carboxyl groups such as $C_2$–$C_6$ alkyl esters, phenyl esters and benzoyl esters.

In the polycondensation reaction for production of the wholly aromatic polyester of this invention, an ester-forming derivative of p-hydroxybenzoic acid or a mixture of at least 60 mole % of an ester-forming derivative of p-hydroxybenzoic acid and up to 40 mole % of an ester-forming derivative of another aromatic hydroxycarboxylic acid is used as the above ester derivative of the aromatic hydroxycarboxylic acid to produce the aromatic hydroxycarboxylic acid residues (A) of formula (I) in the main polymer chain.

The ester-forming derivative of an aromatic diol which gives the aromatic diol residues (B) represented by formula (II) are derived from an aromatic diol represented by the following formula (II)'

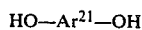 (II)' wherein $Ar^{21}$ represents a divalent aromatic group, a p phenylene or 4,4'-diphenylene group.

The aromatic diol of formula (II)' is hydroquinone or 4,4'-dihydroxydiphenyl.

Examples of the ester-forming derivatives of the aromatic diol are preferably $C_2$–$C_6$ alkanoyl esters or benzoyl esters.

In the polycondensation reaction for production of the wholly aromatic polyester of the invention, at least one of ester-forming derivatives of hydroquinone and ester-forming derivatives of 4,4'-hydroxydiphenyl is used to form the aromatic diol residues (B) represented by formula (II) in the main polymer chain.

The ester-forming derivatives of 4,4'-dihydroxydiphenyl ether which gives the 4,4'-dihydroxydiphenyl ether residues (C) represented by formula (III) are, for example, $C_2$–$C_6$ alkanoyl and benzoyl esters of 4,4'-dihydroxydiphenyl ether represented by the following formula (III)'

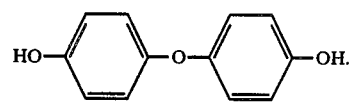 (III)'

According to this invention, up to 40 mole % in total of at least one of the ester-forming derivatives of hydroquinone and ester-forming derivatives of 4,4'-dihydroxydiphenyl and the ester-forming derivatives of 4,4'-dihydroxydiphenyl ether may be replaced by an ester-forming derivative of another diol. Examples of the other diol are preferably aromatic diols having 6 to 15 carbon atoms such as resorcinol, 3,4'-dihydroxydiphenyl, 2,6-dihydroxynaphthalene, 3,4'-dihydroxydiophenyl ether, phenylhydroquinone, chlorohydroquinone, methylhydroquinone and 2,2-bis(4-hydroxyphenyl)propane. Preferred ester-forming derivatives of these diols are, for example, $C_2$–$C_6$ alkanoyl and benzoyl esters of these diols.

The aromatic dicarboxylic acid or its ester-forming derivative (D) which gives the aromatic dicarboxylic acid residues (D) represented by formula (IV) is an aromatic dicarboxylic acid represented by the following formula (IV)'

 (IV)' wherein $Ar^{31}$ represents a divalent aromatic group such as a p-phenylene group, or an ester-forming derivative thereof.

Preferred examples of the aromatic dicarboxylic acid of formula (IV)' are aromatic dicarboxylic acids having 8 to 15 carbon atoms such as terephthalic acid, 4,4'-dicarboxydiphenyl ether, 3,4'-dicarboxydiphenyl ether, 4,4'-dicarboxydiphenyl, isophthalic acid, 2,6-dicarboxynaphthalene and 2,7-dicarboxynaphthalene.

The ester-forming derivative of the aromatic dicarboxylic acid is preferably a $C_2$–$C_6$ alkyl ester, a phenyl ester and a benzyl ester of the aromatic dicarboxylic acid.

In the polycondensation for production of the wholly aromatic polyester of this invention, terephthalic acid or its ester-forming derivative, or a mixture of at least 60 mole % of it and up to 40 mle % of the other aromatic dicarboxylic acid or its ester-forming derivative is used to form the aromatic dicarboxylic acid residues (D) of formula (IV) in the main polymer chain.

A catalyst may be used in the starting mixture for the polycondensation reaction. The proportion of the catalyst used is usually 0.0001 to 1% by weight, preferably 0.001 to 0.1% by weight, based on the weight of the starting mixture. Examples of the catalyst are aluminum acetate, calcium acetate, magnesium acetate, potassium acetate, sodium acetate, potassium phosphate, sodium sulfate, copper acetate, antimony oxide, tetrabutoxytitanium and tin acetate.

When an acetic acid ester of a hydroxycarboxylic acid, an aromatic dicarboxylic acid and a bis-acetic acid ester of an aromatic diol are used as starting materials, the polycondensation reaction may be carried out, for example, by heating the materials at a temperature of 200° to 450° C., preferably 250° to 400° C., usually under atmospheric pressure to a reduced pressure of 0.1 mmHg, and distilling off the acetic acid formed by the reaction. When a phenol ester of a hydroxycarboxylic acid, a bisphenyl ester of an aromatic dicarboxylic acid and an aromatic diol are used as the raw materials, the polycondensation reaction may be carried out, for example, by heating these materials at a temperature of 200° to 450° C., preferably 250° to 400° C., usually under atmospheric pressure to a reduced pressure of 0.1 mmHg, and distilling off the phenol formed by the reaction.

Thus, according to this invention, there can be obtained the wholly aromatic polyester of the invention having the aromatic hydroxycarboxylic acid residues (A) represented by formula (I), the aromatic diol residues (B) represented by formula (II), the 4,4'-dihydroxydiphenyl ether residues (C) represented by formula (III), and the aromatic dicarboxylic acid residues (D) represented by formula (IV).

Preferably, the aromatic hydroxycarboxylic acid residues (A) are, for example, p-hydroxybenzoic acid residues corresponding to formula (I) in which $Ar^1$ is a p-phenylene group, and a mixture of at least 60 mole % of p-hydroxybenozic acid residues and up to 40 mole % of a divalent aromatic hydrocarbon group other than p-phenylene, such as m-phenylene or 2,6-naphthylene. The proportion of the p-hydroxybenzoic acid residues in the mixture is preferably at least 70 mole %, more preferably at least 80 mole %, especially preferably at least 90 mole %.

The aromatic diol residues (B) are, for example, hydroquinone residues corresponding to formula (II) in which $Ar^2$ is p-phenylene, 4,4'-dihydroxydiphenyl residues corresponding to formula (II) in which $Ar^2$ is 4,4'-diphenylene, and a mixture of these residues.

Polymers in which up to 40 mole % of the aromatic diol residues (B) and the 4,4'-dihydroxydiphenyl ether residues (C) combined is replaced by another divalent aromatic group selected from m-phenylene, 3,4'-diphenylene, 2,6-naphthylene,

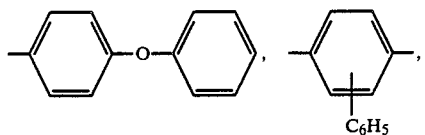

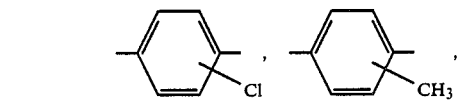

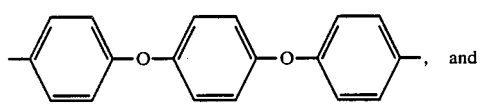, and

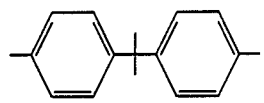

are also included within the wholly aromatic polyesters of the invention.

When the polyester contains the other divalent aromatic group, the proportion of the aromatic diol residues (B) and/or 4,4'-dihydroxydiphenyl ether residues (C) in the entire residues is preferably at least 70 mole %, more preferably at least 80 mole %, and especially preferably at least 90 mole %.

Preferred examples of the aromatic dicarboxylic acid residues (D) are terephthalic acid residues corresponding to formula (IV) in which $Ar^3$ is a p-phenylene group, and a mixture of at least 60 mole % of terephthalic acid residues and up to 40 mole % of another divalent aromatic group selected from

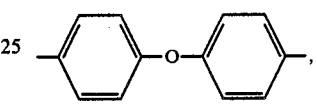

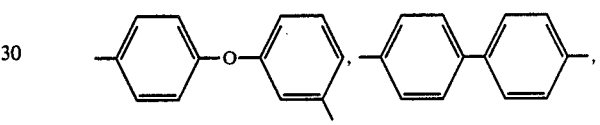

m-phenylene, 2,6-naphthylene and 2,7-naphthylene.

The proportion of terephthalic acid residues in the mixture is preferably at least 70 mole %, more preferably at least 80 mole %, especially preferably at least 90 mole %.

The wholly aromatic polyester of this invention comprises 30 to 80 mole %, preferably 40 to 70 mole %, of the residues (A), 1 to 20 mole %, preferably 3 to 18 mole %, of the residues (B), 1 to 32 mole %, preferably 3 to 24 mole %, of the residues (C), and 10 to 35 mole %, preferably 15 to 30 mole %, of the residues (D) based on the total moles of the residues (A), (B), (C) and (D).

When the aromatic diol residues (B) are hydroquinone residues, the proportion of the hydroquinone residues is preferably 3 to 16 mole % based on the total moles.

On the basis of the stoichiometric theory, the total moles of the residues (B) and (C) are substantially equal to the moles of the residues (D) in the wholly aromatic polyester of the invention. The residues (A), (B), (C) and (D) are distributed randomly and are bonded to each other through ester linkages.

Especially preferred wholly aromatic polyesters of the invention comprise
(A-1) p-hydroxybenzoic acid residues represented by the following formula (I)-1

(I)-1

(B-1) hydroquinone residues represented by the following formula (II)-1

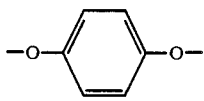
(II)-1

(C) 4,4'-diohydroxydiphenyl ether residues of formula (III)

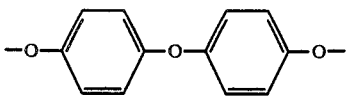
(III)

and (D-1) terephthalic acid residues represented by the following formula (IV)-1

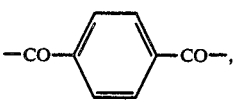
(IV)-1 and (E) the proportions of the residues (A-1), (B-1), (C) and (D-1) are 40-70 mole %, 3-16 mole %, 3-24 mole %, and 15-30 mole %, respectively, based on the total moles of these residues, provided that the sum of the moles of the residues (B-1) and (C) are substantially equal to the moles of the residues (D-1).

Those polymers in which a portion of the hydroquinone residues of formula (II-1), preferably up to 40 mole % of the hydroquinone residues are replaced by aromatic diol residues of the following formula (II)-2

(II)-2 are especailly preferred.

The wholly aromatic polyester of the invention preferably shows a melt-viscosity, measured at a temperature 30° C. higher than the melting point of the wholly aromatic polyester and a shear speed of 100 sec$^{-1}$, of $10^2$ to $10^7$ poises, preferably $2\times10^2$ to $10^6$ poises, especially preferably $5\times10^2$ to $10^5$ poises.

When it is difficult to measure the melting point of the wholly aromatic polyester, its melt viscosity range, same as above, can be defined by using its softening point instead of its melting point as a measure.

Investigations of the present inventors have shown that the present invention can further provide a wholly aromatic polyester of the following composition which can likewise achieve the objects of the invention as does the above wholly aromatic polyester according to the first aspect of the invention.

Thus, according to the present invention, the objects and advantages of the invention are secondly achieved by a melt-moldable wholly aromatic polyester comprising (A) aromatic hydroxycarboxylic acid residues represented by the following formula (I)

(I)

wherein Ar$^1$ represents a divalent aromatic hydrocarbon group at least 60 mole % of which consists of a p-phenylene group, (C)' aromatic diol residues represented by the following formula (V)

$$-O-Ar^4-O- \qquad (V)$$

wherein Ar$^4$ represents a group at least 60 mole % of which consists of a group of the following formula (a)

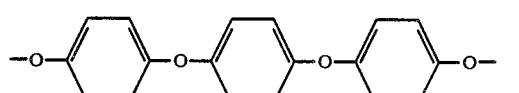
(a)

or a group of the formula (a) and a group of the following formula (b)

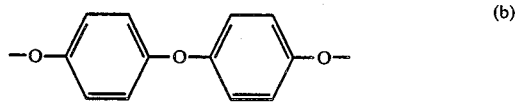
(b)

and (D) aromatic dicarboxylic acid residues represented by the following formula (IV)

$$-CO-Ar^3-CO- \qquad (IV)$$

wherein Ar$^3$ represents a divalent aromatic group at least 60 mole % of which consists of a p-phenylene group, and (E)' the proportions of the residues (A), (C)' and (D) are 30-80 mole %, 10-35 mole %, and 10-35 mole %, respectively based on the total moles of the residues (A), (C)' and (D), provided that the moles of the residues (C)' are substantially equal to the moles of the residues (D).

The above wholly aromatic polyester of the invention can be produced, as in the production of the wholly aromatic polyester according to the first aspect of the invention, by heating an ester-forming derivative of an aromatic hydroxycarboxylic acid represented by formula (I)', an aromatic dicarboxylic acid represented by formula (IV)' or its ester-forming derivative, and an ester-forming derivative of an aromatic diol represented by the following formula (V)'

$$HO-Ar^{41}-OH \qquad (V)'$$

wherein Ar$^{41}$ represents a divalent aromatic group such as the group of formula (a) above, or the group of formula (b) above, at an elevated temperature under reduced pressure, and distilling off the resulting low-boililng compounds.

Examples of the ester-forming derivative of the aromatic hydroxycarboxylic acid, the aromatic dicarboxylic acid and its ester-forming derivative may be the same as given hereinabove.

Preferred examples of the aromatic diols of formula (V)' are those having 6 to 15 carbon atoms, such as 4,4'-dihydroxydiphenyl ether, 1,4-bis(4-hydroxyphenoxy)benzene, hydroquinone, 4,4'-dihydroxydiphenyl, resorcinol, 3,4'-dihydroxydiphenyl, 3,4'-dihydroxydiphenyl ether, phenylhydroquinone, chlorohydroquinone, methylhydroquinone and 2,2-bis(4-hydroxyphenyl)propane.

Preferred examples of the ester-forming derivatives thereof are $C_2$–$C_6$ alkanoyl esters and benzoyl esters of the aromatic diols.

In the polycondensation for producing the wholly aromatic polyester of the invention stated above, an ester-forming derivative of 1,4-bis(4-hydroxyphenoxy)benzene, a mixture of it with an ester-forming derivative of 4,4'-dihydroxydiphenyl ether, or a mixture of at least 60 mole % of the ester-forming derivative of 1,4-bis(4-hydroxyphenoxy)benzene or the above mixture and up to 40 mole % of an ester-forming derivative of another divalent aromatic diol to form the aromatic diol residues (C)' of formula (V) in the main polymer chain.

The aromatic hydroxycarboxylic acid residues (A) and the aromatic dicarboxylic acid residues (D) forming the wholly aromatic polyester of the invention can be described in quite the same way as above.

Preferred examples of the aromatic diol residues (C)' include 1,4-bis(4-hydroxyphenoxy)benzene residues corresponding to formula (V) in which $Ar^4$ is the group of formula (a), a mixture of the 1,4-bis(4-hydroxyphenoxy)benzene residues and 4,4'-dihydroxydiphenyl ether residues of formula (V) in which $Ar^4$ is the group of formula (b), and a mixture of at least 60 mole % of the group of formula (b) or a mixture of it with the group of formula (b) and up to 40 mole % of the other divalent aromatic diol residues.

The mole ratio of the group of formula (a) to the group of formula (b) is from 100:0 to 10:90, preferably from 80:20 to 20:80.

The wholly aromatic polyester according to the second aspect of this invention comprises 30 to 80 mole %, preferably 40 to 70 mole %, of the residues (a), 10 to 35 mole %, preferably 15 to 30 mole %, of the residues (C)' and 10 to 35 mole %, preferably 15 to 30 mole %, of the residues (D), based on the total moles of the residues (A), (C)' and (D). According to the theory of stoichiometry the moles of the residues (C)' are substantially equal to the moles of the residues (D). The residues (A), (C)' and (D) are randomly distributed and bonded to each other through ester linkages. Preferably, this wholly aromatic polyester also has a melt viscosity, measured at a temperature 30° C. higher than the melting point of the polyester and a shear speed of 100 $sec^{-1}$, of $10^2$ to $10^7$, preferably $2\times 10^2$ to $10^6$ poises, and $5\times 10^2$ to $10^5$ poises.

When it is difficult to measure the melting point of the wholly aromatic polyester, its melt viscosity range, same as above, can be defined by using its softening point instead of its melting point as a measure.

The wholly aromatic polyesters of the invention are substantially linear, and any of the aforesaid residues may be positioned at the ends of the polymer chain. The wholly aromatic polyesters of the invention also include those in which the carboxyl group terminals are esterified with monohydric lower alcohols such as methanol, ethanol and isopropanol or monovalent aromatic hydroxyl compounds such as phenol and cresol, and those in which the hydroxyl terminals are esterified with monocarboxylic acids such as acetic acid, propionic acid and benzoic acid.

The glass transition temperature (Tg) of the wholly aromatic polyester of the invention cannot be measured by an ordinary differential scanning calorimeter (DSC). Its melting point (Tm) measured by DSC is usually 200° to 450° C., preferably 250° to 400° C.

Fibers melt-spun from the wholly aromatic polyeter of the invention usually have a modulus of 100 to 2,000 g/d, preferably 200 to 1500 g/d, a tenacity of 5 to 50 g/d, preferably 10 to 40 g/d, and an elongation of 1 to 10%, preferably 2 to 6%.

Since the wholly aromatic polyesters are excellent in mechanical strength properties such as flexural rigidity, tensile strength and impact strength, heat resistance and resistance to hydrolysis at high temperatures and has superior melt-moldability, and have excellent melt-moldability, they can be utilized in the production of heat-resistant articles including fibers.

The following examples illustrate the aromatic copolyesters provided by this invention more specifically. The properties of the aromatic copolyesters were evaluated by the following methods.

Tm and Tg

About 10 mg of a sample of the wholly aromatic polyester was heated from 50° to 450° C. at a rate of 20° C./min., and then cooled to 50° C. at a rate of 40° C. by using a differential scanning calorimeter of Perkin-Elmer Company (model DSC II). Again the sample was heated to 450° C. at a rate of 20° C./min., and an endothermic thermogram of the sample was measured. The melting point Tm was determined from the endothermic peak values in the first and second temperature elevations, and the glass transition point Tg, from the first flex point in the second temperature elevation.

Melt viscosity

Measured at a shear speed of 100 $sec^{-1}$ by using a capillary rheometer made by Shimazu Seisakusho. The measurement was made at a temperature 30° C. higher than the melting point (Tm) in the second temperature elevation.

Spinning

A polyester sample was spun from a cylindrical die having a nozzle diameter of 0.2 mm and a nozzle length of 1 mm using a melt tension tester (made by Tokyo Seiki Seisakusho). The resulting filament was wound up on a roll using an ordinary speed variable motor. The spinning temperature was properly chosen from temperatures of 400° C. or below. The filament spun from the die was not particularly cooled.

Heat-treatment

The spun filament was heat-treated under relaxed conditions in a stream of nitrogen or under reduced pressure.

Tensile test

The test was conducted at room temperature (23° C.) using an Instron universal tester (Model 1123 made by Instron Co.). At this time, the sample length between clamps was 100 mm, and the pulling speed was adjusted to 100 mm/min. The tensile modulus was calculated using the stress at 1% strain.

EXAMPLE 1

A copolyester composed of 40 mole % of p-hydroxybenzoic acid units, 15 mole % of 4,4'-dihydroxydiphenyl units, 15 mole % of 4,4'-dihydroxydiphenyl ether units and 30 mole % of terephthalic acid units was synthesized by the following procedure.

A 500 ml reactor was charged with 72 g (0.4 mole) of p-acetoxybenzoic acid, 40.5 g (0.15 mole) of 4,4'- diacetoxydiphenyl, 42.9 g (0.15 mole) of 4,4'-diacetoxydiphenyl ether, and 49.8 g (0.3 mole) of terephthalic acid, and they were reacted at 275° C. with stirring for 1 hour. Acetic acid was distilled off, and the temperature of the reaction mixture was raised to 350° C. over the course of 2 hours. The reaction mixture was then maintained at 350° C. for 1 hour under 0.5 mmHg.

By DSC measurement, the polyester was found to have a Tm of 338° C. in the first temperature elevation, and 334° C. in the second temperature elevation, and no Tg was detected. The polyester had a melt viscosity, measured at 364° C. and 100 sec$^{-1}$, of 2,300 poises.

Fibers having a size of 28 denier were spun from the resulting copolyester at 380° C., and then heat-treated at 300° C. and 1 mmHg for 24 hours. The final fibers had a modulus of 530 g/d, a tenacity of 20.3 g/d and an elongation of 3.8%.

EXAMPLE 2

Example 1 was repeated except that the starting monomer composition was changed as shown in Table 1. The composition and properties of the resulting wholly aromatic polyester were measured as in Example 1, and the results are shown in Tables 2 and 3.

EXAMPLE 3

Example 1 was repeated except that the starting monomer composition was changed as shown in Table 1. The properties of the resulting wholly aromatic polyester were measured as in Example 1 except that the spinning temperature was changed to 360° C. The results are shown in Tables 2 and 3.

EXAMPLE 4

Example 1 as repeated except that the starting monomer composition was changed as shown in Table 1. The composition and properties of the resulting wholly aromatic polyester were measured as in Example 1, and the results are shown in Tables 2 and 3.

EXAMPLE 5

A 500 ml reactor was charged with starting monomers having the composition shown in Table 1, and the monomers were reacted at 275° C. with stirring for 1 hour. Acetic acid was distilled off, and the temperature was then elevated to 380° C. over the course of 2 hours. The reaction mixture was maintained at 380° C. and 0.5 mmHg for 1 hour.

The properties of the resulting aromatic polyester were measured as in Example 1 except that the spinning temperature was changed to 400° C., and the heat-treatment temperature, 340° C. The results are shown in Tables 2 and 3.

EXAMPLE 6

A 500 ml reactor was charged with starting monomers having the composition shown in Table 1, and the monomers were reacted at 275° C. with stirring for 1 hour. Acetic acid was distilled off, and the temperature was then elevated to 330° C. over the course of 2 hours. The reaction mixture was maintained at 330° C. and 0.5 mmHg for 1 hour.

The properties of the resulting aromatic polyester were measured as in Example 1 except that the spinning temperature was changed to 350° C., and the heat-treatment temperature, 260° C. The results are shown in Tables 2 and 3.

COMPARATIVE EXAMPLE 1

A 500 ml reactor was charged with starting monomers having the composition shown in Table 1, and the monomers were reacted at 275° C. with stirring for 1 hour. Acetic acid was distilled off, and the temperature was then elevated to 400° C. over the course of 2 hours. The reaction mixture was maintained at 400° C. and 0.5 mmHg for 1 hour.

The properties of the resulting aromatic polyester were measured as in Example 1. An attempt was made to spun the resulting polyester at 350° to 450° C. But it could not be fiberized and fibers cannot be obtained. The results are shown in Tables 2 and 3.

COMPARATIVE EXAMPLE 2

A 500 ml reactor was charged with starting monomers having the composition shown in Table 1, and the monomers were reacted at 275° C. with stirring for 1 hour. Acetic acid was distilled, and then the temperature was elevated to 330° C. over the course of 2 hours. The reaction mixture was reacted at 350° C. and 0.5 mmHg for 1 hour.

The properties of the resulting wholly aromatic polyester were measured as in Example 1. Its Tg was 180° C. The spinning temperature was changed to 350° C., and the heat-treatment temperature, to 280° C. The results are shown in Tables 2 and 3.

EXAMPLE 7

Example 1 was repeated except that starting monomers having the composition shown in Table 1 were used, and the reaction temperature was changed to 370° C.

The properties of the wholly aromatic polyester were measured as in Example 1 except that the spinning temperature was changed to 400° C., and the heat-treatment temperature, to 330° C. The results are shown in Tables 2 and 3.

EXAMPLE 8

Example 1 was repeated except that starting monomers having the composition shown in Table 1 were used.

The properties of the resulting wholly aromatic polyester were measured as in Example 1. The results are shown in Tables 2 and 3.

EXAMPLE 9

Example 1 was repeated except that starting monomers having the composition shown in Table 1 were used.

The properties of the resulting wholly aromatic polyester were measured as in Example 1 except that the heat-treatment temperature was changed to 290° C. The results are shown in Tables 2 and 3.

EXAMPLE 10

Example 1 was repeated except that starting monomers having the composition shown in Table 1 were used.

The properties of the resulting wholly aromatic polyester were measured as in Example 1. The results are shown in Tables 2 and 3.

EXAMPLE 11

Example 1 was repeated except that starting monomers having the composition shown in Table 1 were used.

The properties of the resulting wholly aromatic polyester were measured as in Example 1 except that the spinning temperature was changed to 400° C., and the heat-treatment temperature, to 360° C. The results are shown in Tables 2 and 3.

COMPARATIVE EXAMPLE 3

Example 1 was repeated except that starting monomers having the composition shown in Table 1 were used and the reaction temperture was changed to 400° C.

The Tm and Tg of the resulting polyester were not detected at 450° C. or below. An attempt was made to spin the polyester at 350° to 50° C., but no fiber could be obtained.

EXAMPLE 12

A 500 ml reactor was charged with starting materials having the composition shown in Table 1. The monomers were reacted at 275° C. for 1 hour with stirring. Acetic acid was distilled off, and the temperature was raised to 380° C. over the course of 2 hours. Then, the reaction mixture was maintained at 380° C. and 0.5 mmHg for 10 minutes.

The properties of the resulting wholly aromatic polyester were measured in the same way as in Example 1 except that the heat-treatment temperature was changed to 320° C. The results are shown in Tables 2 and 3.

EXAMPLES 13–16

Example 12 was repeated except that raw materials having the compositions indicated in Table 1 were used.

The properties of the resulting wholly aromatic polyesters were measured as in Example 1 except that the heat-treatment temperature was changed to 300° C. (Example 13), 310° C. (Example 14), 290° C. (Example 15), and 280° C. (Example 16). The results are shown in Tables 2 and 3.

EXAMPLE 17

A 500 ml reactor was charged with starting monomers having the composition shown in Table 1, and the materials were reacted at 275° C. for 1 hour with stirring. Acetic acid was distilled off, and then the temperature was elevated to 380° C. over the course of 2 hours. The reaction mixture was cooled and pulverized to a size of less than 1 mm, and then maintained at 330° C. and 0.5 mmHg for 10 hours.

The properties of the resulting wholly aromatic polyester were measured as in Example 1. The results are shown in Tables 2 and 3.

EXAMPLE 18

Example 12 was reacted except that starting monomers having the composition shown in Table 1 were used. The properties of the resulting wholly aromatic polyester were measured as in Example 1. The results are shown in Tables 2 and 3.

TABLE 1

| | Composition of the starting monomers [g(mole)] | | | | | |
|---|---|---|---|---|---|---|
| | p-acetoxybenzoic acid | 4,4'-diacetoxydiphenyl | p-diacetoxy benzene | 4,4'-diacetoxy-diphenyl ether | 1,4-bis-(4-acetoxy-phenoxy) benzene | Terephthalic acid |
| Ex. 1 | 72(0.4) | 40.5(0.15) | — | 42.9(0.15) | — | 49.8(0.3) |
| Ex. 2 | 90(0.5) | 33.8(0.125) | — | 35.8(0.125) | — | 41.5(0.25) |
| Ex. 3 | 108(0.6) | 27 (0.1) | — | 28.6(0.1) | — | 33.2(0.2) |
| Ex. 4 | 126(0.7) | 20.3(0.75) | — | 21.5(0.75) | — | 24.9(0.15) |
| Ex. 5 | 108(0.6) | 40.5(0.15) | — | 14.3(0.05) | — | 33.2(0.2) |
| Ex. 6 | 108(0.6) | 13.5(0.05) | — | 42.9(0.15) | — | 33.2(0.2) |
| CEx. 1 | 108(0.6) | 54 (0.2) | — | — | — | 33.2(0.2) |
| CEx. 2 | 108(0.6) | — | — | 57.2(0.2) | — | 33.2(0.2) |
| Ex. 7 | 72(0.4) | — | 14.6(0.075) | 64.4(0.225) | — | 49.8(0.3) |
| Ex. 8 | 90(0.5) | — | 11.6(0.06) | 54.3(0.19) | — | 41.5(0.25) |
| Ex. 9 | 108(0.6) | — | 9.7(0.05) | 42.9(0.15) | — | 33.2(0.2) |
| Ex. 10 | 126(0.7) | — | 7.8(0.04) | 31.5(0.11) | — | 24.9(0.15) |
| Ex. 11 | 108(0.6) | — | 14.6(0.075) | 21.5(0.075) | — | 33.2(0.2) |
| CEx. 3 | 108(0.6) | — | 38.8(0.2) | — | — | 33.2(0.2) |
| Ex. 12 | (0.5) | — | (0.19) | (0.19) | (0.06) | (0.25) |
| Ex. 13 | (0.6) | — | (0.15) | (0.15) | (0.05) | (0.2) |
| Ex. 14 | (0.4) | — | (0.15) | (0.15) | (0.15) | (0.3) |
| Ex. 15 | (0.5) | — | (0.125) | (0.125) | (0.125) | (0.25) |
| Ex. 16 | (0.6) | — | (0.1) | (0.1) | (0.1) | (0.2) |
| Ex. 17 | (0.6) | — | — | — | (0.2) | (0.2) |
| Ex. 18 | (0.6) | — | (0.05) | (0.1) | (0.05) | (0.2) |

Ex.: Example
CEx.: Comparative Example

TABLE 2

| | Composition of the resulting polyester (mole %) | | | | | |
|---|---|---|---|---|---|---|
| | (A) p-hydroxybenzoic acid | (B) 4,4'-dihydroxydiphenyl | hydroquinone | (C) 4,4'-dihydroxy-diphenyl ether | (C)' 1,4-bis-(4-hydroxy-phenoxy) benzene | (D) Terephthalic acid |
| Ex. 1 | 40 | 15 | — | 15 | — | 30 |
| Ex. 2 | 50 | 12.5 | — | 12.5 | — | 25 |
| Ex. 3 | 60 | 10 | — | 10 | — | 20 |
| Ex. 4 | 70 | 7.5 | — | 7.5 | — | 15 |
| Ex. 5 | 60 | 15 | — | 5 | — | 20 |
| Ex. 6 | 60 | 5 | — | 15 | — | 20 |
| CEx. 1 | 60 | 20 | — | — | — | 20 |

TABLE 2-continued

| | Composition of the resulting polyester (mole %) | | | | | |
|---|---|---|---|---|---|---|
| | (A) p-hydroxybenzoic acid | (B) 4,4'-dihydroxydiphenyl | hydroquinone | (C) 4,4'-dihydroxy-diphenyl ether | (C)' 1,4-bis-(4-hydroxy-phenoxy) benzene | (D) Terephthalic acid |
| CEx. 2 | 60 | — | — | 20 | — | 20 |
| Ex. 7 | 40 | — | 7.5 | 22.5 | — | 30 |
| Ex. 8 | 50 | — | 6 | 19 | — | 25 |
| Ex. 9 | 60 | — | 5 | 15 | — | 20 |
| Ex. 10 | 70 | — | 4 | 11 | — | 15 |
| Ex. 11 | 60 | — | 7.5 | 7.5 | — | 20 |
| CEx. 3 | 60 | — | 20 | — | — | 20 |
| Ex. 12 | 50 | — | — | 19 | 6 | 25 |
| Ex. 13 | 60 | — | — | 15 | 5 | 20 |
| Ex. 14 | 40 | — | — | 15 | 15 | 30 |
| Ex. 15 | 50 | — | — | 12.5 | 12.5 | 25 |
| Ex. 16 | 60 | — | — | 10 | 10 | 20 |
| Ex. 17 | 60 | — | — | — | 20 | 20 |
| Ex. 18 | 60 | — | 5 | 10 | 5 | 20 |

TABLE 3

| | Properties of the polyester | | | | Properties of the filament | | | |
|---|---|---|---|---|---|---|---|---|
| | Tm in the first temperature elevation (°C.) | Tm in the second temperature elevation (°C.) | Melt viscosity (poises) | Temperature at which the melt viscosity was measured (°C.) | Size (denier) | Modulus (g/d) | Tenacity (g/d) | Elongation (%) |
| Ex. 1 | 338 | 334 | 2300 | 364 | 28 | 530 | 20.3 | 3.8 |
| Ex. 2 | 325 | 322 | 1800 | 352 | 32 | 480 | 19.3 | 4.0 |
| Ex. 3 | 312 | 307 | 2400 | 342 | 24 | 570 | 21.4 | 3.7 |
| Ex. 4 | 340 | 335 | 2600 | 365 | 27 | 490 | 18.6 | 3.8 |
| Ex. 5 | 362 | 360 | 1800 | 392 | 30 | 720 | 25.6 | 3.6 |
| Ex. 6 | 302 | 330 | 3300 | 330 | 25 | 360 | 15.3 | 4.3 |
| CEx. 1 | 428 | 416 | 6800 | 446 | Spinning impossible | — | — | — |
| CEx. 2 | (253 310) | 251 | 9300 | 281 | 25 | 110 | 9.6 | 8.8 |
| Ex. 7 | 343 | 338 | 2500 | 368 | 31 | 410 | 16.1 | 3.9 |
| Ex. 8 | 328 | 324 | 3300 | 354 | 28 | 330 | 14.0 | 4.2 |
| Ex. 9 | 307 | 304 | 2300 | 334 | 30 | 360 | 15.6 | 4.3 |
| Ex. 10 | 328 | 324 | 2700 | 354 | 25 | 330 | 17.2 | 5.2 |
| Ex. 11 | 386 | 381 | 2600 | 411 | 33 | 620 | 24.3 | 3.9 |
| CEx. 3 | — | — | — | — | Spinning impossible | — | — | — |
| Ex. 12 | 339 | 333 | 1600 | 363 | 27 | 680 | 19.8 | 2.9 |
| Ex. 13 | 325 | 321 | 1800 | 351 | 32 | 720 | 21.4 | 3.0 |
| Ex. 14 | 332 | 327 | 2000 | 357 | 28 | 750 | 21.4 | 2.9 |
| Ex. 15 | 324 | 310 | 2300 | 340 | 26 | 640 | 20.4 | 3.2 |
| Ex. 16 | 312 | 304 | 2500 | 334 | 30 | 780 | 24.3 | 3.1 |
| Ex. 17 | 380 | 375 | 1200 | 405 | 27 | 730 | 20.3 | 2.8 |
| Ex. 18 | 330 | 324 | 1700 | 354 | 27 | 780 | 21.9 | 2.8 |

What we claim is:

1. A melt-moldable wholly aromatic polyester comprising (A) aromatic hydroxycarboxylic acid residues represented by the following formula (I)

wherein Ar¹ represents a divalent aromatic hydrocarbon group at least 60 mole % of which consists of a p-phenylene group, (B) aromatic diol residues represented by the following formula (II)

wherein Ar² represents at least one divalent aromatic group selected from p-phenylene and 4,4'-diphenylene groups, (C) 4,4'-dihydroxydiphenyl ether residues represented by the following formula (III)

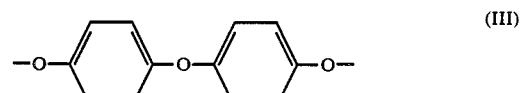

and (D) aromatic dicarboxylic acid residues represented by the following formula (IV)

wherein Ar³ represents a divalent aromatic group at least 60 mole % of which consists of a p-phenylene group, and (E) the proportions of the residues (A), (B), (C) and (D) being 30–80 mole %, 1–20 mole %, 1–32 mole % and 10–35 mole %, respectively, based on the total moles of the residues (A), (B), (C) and (D), provided that the sum of the moles of the residues (B) and (C) is substantially equal to the moles of the residues (D).

2. The wholly aromatic polyester of claim 1 wherein the aromatic hydroxycarboxylic acid residues (A) are p-hydroxybenzoic acid residues corresponding to formula (I) in which Ar¹ is a p-phenylene group.

3. The wholly aromatic polyester of claim 1 wherein the divalent aromatic hydrocarbon group other than the p-phenylene group, which may account for not more than 40 mole %, is an m-phenylene or 2,6-naphthylene group.

4. The wholly aromatic polyester of claim 1 wherein the aromatic diol residues (B) are hydroquinone residues corresponding to formula (II) in which Ar² is a p-phenylene group.

5. The wholly aromatic polyesters of claim 1 wherein the aromatic diol residues (B) are 4,4'-dihydroxydiphenyl residues corresponding to formula (II) in which Ar² is a 4,4'-diphenylene group.

6. The wholly aromatic polyester of claim 1 wherein up to 40 mole % of the sum of the aromatic diols of formula (II) and the 4,4'-dihydroxydiphenyl ether residues of formula (III) is replaced by residues of another diol selected from the class consisting of m-phenylene, 3,4'-diphenylene, 2,6-naphthylene,

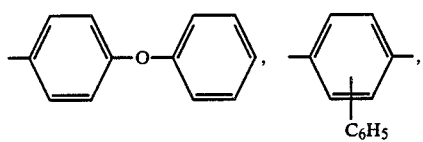

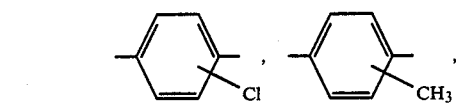

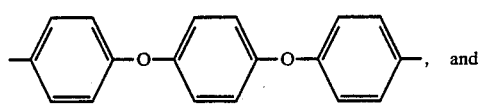

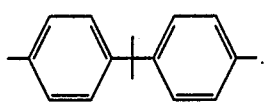

7. The wholly aromatic polyester of claim 1 wherein the aromatic dicarboxylic acid residues (D) are terephthalic acid residues corresponding to formula (IV) in which Ar³ is a p-phenylene group.

8. The wholly aromatic polyester of claim 1 wherein the divalent aromatic group other than the p-phenylene group, which may account for not more than 40 mole % of Ar³ in formula (IV), is selected from the class consisting of

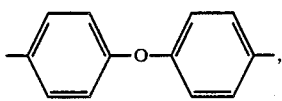

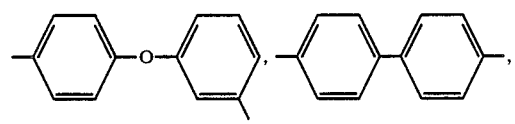

m-phenylene, 2,6-naphthylene and 2,7-naphthylene.

9. The wholly aromatic polyester of claim 1 wherein the proportion of the aromatic hydroxycarboxylic acid residues (A) is 40 to 70 mole % based on the total moles of the residues (A), (B), (C) and (D).

10. The wholly aromatic polyester of claim 1 wherein the proportion of the aromatic diol residues (B) is 3 to 18 mole % based on the total moles of the residues (A), (B), (C) and (D).

11. The wholly aromatic polyester of claim 1 wherein the proportion of the aromatic diol residues (B) is 3 to 16 mole % based on the total moles of the residues (A), (B), (C) and (D).

12. The wholly aromatic polyester of claim 1 wherein the aromatic diol residues (B) are 4,4'-dihydroxydiphenyl residues, and the proportion of the 4,4'-dihydroxydiphenyl residues is 3 to 18 mole % based on the total moles of the residues (A), (B), (C) and (d).

13. The wholly aromatic polyesters of claim 1 wherein the proportion Of the 4,4'-dihydroxydiphenyl ether residues is 3 to 24 mole % based on the total moles of the residues (A), (B), (C) and (D).

14. The wholly aromatic polyester of claim 1 wherein the proportion of the aromatic dicarboxylic acid residues (D) is 15 to 30 mole % based on the total moles of the residues (A), (B), (C) and (D).

15. The wholly aromatic polyester of claim 1 which comprises
(A-1) p-hydroxybenzoic acid residues represented by the following formula (I)-1

(B-1) hydroquinone residues represented by the following formula (II)-1

(C) 4,4'-dihydroxydiphenyl ether residues of formula (III)

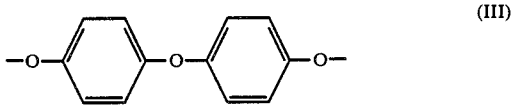

and (D-1) terephthalic acid residues represented by the following formula (IV)-1

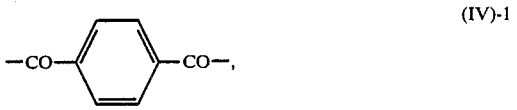

and (E) the proportions of the residues (A-1), (B-1), (C) and (D-1) are 40–70 mole %, 3–16 mole %, 3–24 mole %, and 15–30 mole %, respectively, based on the total moles of these residues, provided that the sum of the moles of the residues (B-1) and (C) are substantially equal to the moles of the residues (D-1).

16. The wholly aromatic polyester of claim 15 which further comprises aromatic diol residues represented by the following formula (II-2)

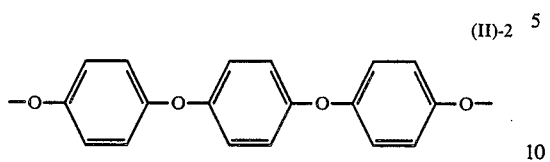

(II)-2 in place of part of the hydroquinone residues of formula (II-1).

17. The wholly aromatic polyester which has a melt viscosity, measured at a shear speed of 100 sec$^{-1}$ and a temperature 30° C. higher than the melting point of the polyester, of $10^2$ to $10^7$ poises.

18. A melt-moldable wholly aromatic polyester comprising
(A) aromatic hydroxycarboxylic acid residues represented by the following formula (I)

  (I)

wherein Ar$^1$ represents a divalent aromatic hydrocarbon group at least 60 mole % of which consists of a p-phenylene group,
(C)' aromatic diol residues represented by the following formula (V)

  (V)

wherein Ar$^4$ represents a group at least 60 mole % of which consists of a group of the following formula (a)

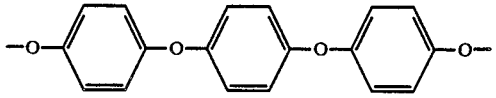  (a)

or a group of the formula (a) and a group of the following formula (b)

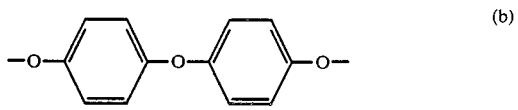  (b)

and (D) aromatic dicarboxylic acid residues represented by the following formula (IV)

  (IV)

wherein Ar$^3$ represents a divalent aromatic group at least 60 mole % of which consists of a p-phenylene group, and
(E)' the proportions of the residues (A), (C)' and (D) are 30–80 mole %, 10–35 mole %, and 10–35 mole %, respectively based on the total moles of the residues (A), (C)' and (D), provided that the moles of the residues (C)' are substantially equal to the moles of the residues (D).

19. The wholly aromatic polyester of claim 18 wherein the aromatic diol residues (C)' are 1,4-bis(4-hydroxyphenoxy)benzene residues corresponding to formula (V) in which Ar$^4$ is the group of formula (a).

20. The wholly aromatic polyester of claim 18 wherein the aromatic diol residues (C)' are a mixture of 1,4-bis(4-hydroxyphenoxy)benzene residues corresponding to formula (V) in which Ar$^4$ is the group of formula (a) and 4,4'-dihydroxydiphenyl ether residues corresponding to formula (V) in which Ar$^4$ is the group of formula (b).

21. The wholly aromatic polyester of claim 18 wherein in formula (V), the mole ratio of the group of formula (a) to the group of formula (b) is from 100:0 to 10:90.

22. The wholly aromatic polyester of claim 18 which has a melt viscosity, measured at a shear speed of 100 sec$^{-1}$ and a temperature 30° C. higher than the melting point of the polyester, of $10^2$ to $10^7$ poises.

* * * * *